United States Patent
Sarao et al.

(10) Patent No.: US 8,924,584 B1
(45) Date of Patent: *Dec. 30, 2014

(54) DETERMINISTIC TRIGGERING OVER AN ETHERNET NETWORK

(75) Inventors: Jeremy A. Sarao, Natick, MA (US); Dennis Bach, Brown Deer, WI (US)

(73) Assignee: Cognex Technology and Investment LLC, Natick, MA (US)

(*) Notice: Subject to any disclaimer, the term of this patent is extended or adjusted under 35 U.S.C. 154(b) by 335 days.

This patent is subject to a terminal disclaimer.

(21) Appl. No.: 13/169,383

(22) Filed: Jun. 27, 2011

Related U.S. Application Data (63) Continuation of application No. 12/057,371, filed on Mar. 28, 2008, now Pat. No. 7,970,924, which is a continuation of application No. 10/185,108, filed on Jun. 28, 2002, now Pat. No. 7,380,016.

(51) Int. Cl.
*G06F 15/16* (2006.01)

(52) U.S. Cl.
USPC ............................ 709/232; 709/208; 709/231

(58) Field of Classification Search
USPC ......................................... 709/208, 231, 232
See application file for complete search history.

(56) References Cited

U.S. PATENT DOCUMENTS

| | | |
|---|---|---|
| 5,440,545 A | 8/1995 | Buchholz et al. |
| 5,519,496 A | 5/1996 | Borgert et al. |
| 6,483,846 B1 | 11/2002 | Huang et al. |
| 6,560,230 B1 | 5/2003 | Li et al. |
| 6,603,744 B2 | 8/2003 | Mizutani et al. |
| 6,741,171 B2 | 5/2004 | Palka et al. |
| 6,911,999 B2 | 6/2005 | Sasaki |
| 7,010,702 B1 | 3/2006 | Bots et al. |

OTHER PUBLICATIONS

U.S. Appl. No. 10/185,108 Office Action mailed Jul. 5, 2006, pp. 1-18.
U.S. Appl. No. 10/185,108 Office Action mailed Dec. 27, 2006, pp. 1-20.
U.S. Appl. No. 10/185,108 Office Action mailed Mar. 20, 2007, pp. 1-3.
U.S. Appl. No. 10/185,108 Office Action mailed May 25, 2007, pp. 1-18.
U.S. Appl. No. 12/057,371, Office Action mailed Sep. 20, 2010, pp. 1-6.

*Primary Examiner* — Kenny Lin (57) ABSTRACT

A method and system for rendering Ethernet linked components deterministic, the method including the step of storing a communication rule set in each of at least two Ethernet linked components where the set specifies rules by which the two components communicate and monitoring communications between the two components to identify any rule that is not followed and then activating an alarm function when a rule is not followed.

29 Claims, 5 Drawing Sheets

DETERMINISTIC TRIGGERING OVER AN ETHERNET NETWORK

CROSS-REFERENCE TO RELATED APPLICATIONS

This application is a continuation of U.S. patent application Ser. No. 12/057,371, filed Mar. 28, 2008, and entitled "Deterministic Triggering Over An Ethernet Network," which is a continuation of U.S. patent application Ser. No. 10/185,108, filed Jun. 28, 2002, and entitled "Deterministic Triggering Over An Ethernet Network," which is a continuation of U.S. patent application Ser. No. 10/017,354, filed Dec. 14, 2001, and entitled "Deterministic Triggering Over An Ethernet Network," now abandoned, all of which are hereby incorporated by reference.

STATEMENT REGARDING FEDERALLY SPONSORED RESEARCH

Not applicable.

BACKGROUND OF THE INVENTION

In many manufacturing industries imaging systems (i.e., cameras) are used to monitor manufacturing processes and gather information for quality control and or process design purposes. To this end, a camera is typically mounted in a position adjacent a manufacturing line station so that work pieces located at the station are within a field of view of the camera. A controller is linked in some fashion to the camera to control camera activation to periodically generate exposures corresponding to the field of view. After generating an exposure, the camera may do any of several different things with the exposure, depending on the function of the imaging system.

Often the imaging system will be part of a much larger control system wherein operation of the camera to collect or forego collecting information is governed by a large set of rules and wherein camera operation and associated functions are an integral part of proper overall system operation. In these cases the controller is typically positioned remotely from the camera, collects information from many system sources and determines how to control the camera as a function thereof.

There are several different ways in which a controller can be linked to a camera. One exemplary way to link a controller to a camera is via a dedicated hardwire control line that directly and solely links the controller and camera. This one-to-one communication solution is advantageous as signals generated by the controller are provided directly to the camera and therefore camera operation can be controlled in a "deterministic" fashion. Herein, the term deterministic means that, given a specific controller signal and assuming that the camera is operating properly, a known and "determined" action is performed by the camera. Thus, in dedicated hardwire systems controller signals are guaranteed to be delivered to the camera.

While hardwire systems are deterministic and therefore advantageous, such systems have several shortcomings. First, not surprisingly, because such systems require dedicated hardwires between each two system components that may communicate, these systems are relatively hardware intensive and therefore relatively expensive. Second, these systems are particularly costly to set up as the labor required to run dedicated lines between each two system components is excessive. Third, even after set up, these systems are difficult to maintain as they are relatively complicated. For instance, a break in any of the dedicated lines requires maintenance personnel to track and trace the line between linked devices to identify and repair the break. Fourth, the number of links between system devices becomes unwieldy. For instance, a single controller may need to communicate with several hundred different system devices (i.e., cameras) in a complex system and therefore may need hundreds of inputs and outputs. Most controllers are not configured to support such massive I/O needs. Fifth, hardwired systems also have the disadvantage of reduced signal strength over long hardwire distances and therefore hardwire configurations are further limited in possible physical configurations.

One other solution for linking a controller to a camera is to use a computer network system. One particularly useful system type is generally referred to as an Ethernet. An Ethernet, in addition to having some advantageous operational features, is particularly advantageous because Ethernet hardware is already extremely prevalent throughout the facilities used within many industries for information interchange and therefore control schemes that operate over the Ethernet can "piggy-back" on existing hardware to provide cost effective functionality.

As in the case of many networking systems, the Ethernet is an electronic network that links various computing devices together and enables communication between the linked devices. The Ethernet generally links various network devices together via cables, data busses, fiber optics, etc., in series and parallel network structures. The linking structure is referred to hereinafter as the Ethernet channel. To communicate, an originating Ethernet device transmits a message (referred to hereinafter as a data packet) on the channel to a destination device that, in part, earmarks the destination device via a destination device address. When the destination device receives the packet, the destination device recognizes the packet as targeting the destination device via the address and accesses packet data to perform some function associated therewith.

Ethernet systems like the one described briefly above overcome several of the problems with hardwired systems. For instance, because devices can be linked in series and parallel instead of in a one-to-one relationship, hardware costs are reduced appreciably. In addition, the task of setting up an Ethernet system is relatively simple when compared to hardwire systems as new devices can be linked to existing Ethernet cables and other transmission medium. Set up costs are further reduced as each Ethernet device manufactured is provided a device unique 48 bit address. Therefore, once hooked up to an Ethernet, a device can be uniquely identified via its address without worrying about network structure and where within the network as a whole the device resides.

Moreover, because Ethernet systems have relatively simple configurations the systems are easy to maintain. Furthermore, Ethernet devices (i.e., controllers, cameras, etc.) needn't support excessive I/O requirements as a single or small number of I/O ports can be used to communicate with virtually every Ethernet-equipped device linked to a network.

Nevertheless, despite the advantages associated with Ethernet systems, such systems have at least one important shortcoming. Specifically, Ethernet systems are not deterministic. In other words, in the case of the camera example given above, given a specific controller transmitted data packet targeting the camera, a known and "determined" action may not be carried out by the camera. This is because, while Ethernet systems facilitate packet delivery most of the time, a small percentage of the time packets are lost or discarded during delivery. Thus, while Ethernet systems may be sufficient in applications where a small number of lost data packets are tolerable, in many cases and, in particular, in many imaging system applications, such non-deterministic operation is not acceptable. To gain a better understanding of the non-deterministic nature of the Ethernet and the problems associated therewith, it is helpful to examine Ethernet operation in more detail and specifically the rules by which an Ethernet device operates to transmit packets to other devices.

Network device access to a shared Ethernet channel is determined by a set of medium access control (MAC) rules that are embedded in each Ethernet device (i.e., in a device interface). The MAC rules define a protocol commonly referred to as the Carrier Sense Multiple Access with Collision Detection (CSMA/CD) protocol that is described next in the context of an exemplary Ethernet communication process.

The CSMA/CD protocol functions somewhat like a dinner party in a dark room. Everyone around a table at the party listens for a period of quiet before speaking (carrier sense). Once a quite period occurs everyone has an equal opportunity to say something (multiple access). If two people start to speak at the same instant, each person detects the fact that more than one person is speaking (collision detection), quits speaking, and waits until there is another quiet period before attempting to speak again.

To translate this into Ethernet terms, each Ethernet linked device must wait until there is no packet on the channel before transmitting. If some other device is transmitting there will be a packet referred to as a carrier on the channel. All other devices must wait until the carrier ceases before trying to transmit their packets. This process of identifying a carrier on the channel is referred to as carrier sense. When a device senses that the channel is clear, the device transmits its packet to the other network devices. All Ethernet devices are equal in their ability to send packets onto the network (no device gets a higher priority than any other device) (i.e., multiple access).

Ethernet packets are transmitted serially, one bit at a time, over the shared channel to every device attached to the channel. Since packets take a finite time to travel from one end of an Ethernet system to the other, the first bits of a transmitted packet do not reach all parts of the network simultaneously. For this reason it's possible for two devices to sense that the network is idle and to start transmitting their packets simultaneously.

If more than one device transmits on the Ethernet channel at the same moment, the packets are said to "collide". The network has a way of identifying collisions (i.e., collision detection) and, upon detecting a collision, notifies each network device that a collision has occurred. Upon receiving notice of a collision, each receiving device instantly reschedules its transmissions using a specially designed "backoff" algorithm. As part of the backoff algorithm, the devices involved each choose a random time interval at which to reschedule the transmission of the packets which keeps the devices from making transmission attempts in lock step.

The design of Ethernet systems is such that, when not overloaded, the majority of collisions are resolved in microseconds and therefore a typical collision does not result in a lost packet. Again, in the event of a collision, a transmitting Ethernet device backs off (i.e., waits) for some number of microseconds and then automatically attempts to retransmit its packet.

On a network with heavy traffic loads it may happen that there are multiple collisions for a given packet transmission. If repeated collisions occur for a given transmission, then the devices involved begin expanding the set of potential backoff times from which they chose their random retransmission times.

Repeated collisions for a given packet transmission attempt indicate a busy network. The expanding backoff process, formally known as "truncated binary exponential backoff," is a clever feature of the Ethernet MAC that provides an automatic method for devices to adjust to traffic conditions on the network. After a set number (e.g., 16) of consecutive collisions for a given transmission attempt, a device finally discards its Ethernet packet.

Thus, the exemplary Ethernet system described above is not determinative because, given a specific control data packet earmarked to be delivered to a camera, there is no guarantee that the packet will be delivered to the camera or, if delivered to the camera, when, within a short period, the packet will be delivered. Again, this uncertainty is not acceptable in many applications and therefore, for these applications, the advantages associated with Ethernet technology have been foregone.

Therefore, it would be advantageous to have a system wherein system devices including controllers and cameras and the like can use an Ethernet to communicate in a deterministic fashion.

SUMMARY OF THE INVENTION

It has been recognized that control of Ethernet linked cameras and the like can be rendered deterministic by providing communication rules accessible by two Ethernet linked components that can be tracked by the components and used to generate alarm signals when rules are broken. For instance, in the case of a camera linked to a controller via an Ethernet for control thereof, each of the controller and the camera can be provided with a rule set corresponding to expected communications between the two components and then processors in each component can track the rules. When a rule is broken, for instance, when a data packet from the controller is to be received by the camera at a specific time and is not received, the component recognizing that the rule is broken activates an alarm or performs some other function calculated to either cause corrective action or indicate the system condition.

Consistent with the above, the present invention includes a method for use with a system including an Ethernet controller linked via an Ethernet channel to an Ethernet device wherein each of the controller and the device are Ethernet components, the controller including a controller processor and a controller memory and the device including a device processor and a device memory, the method for rendering communication between the device and the controller deterministic. The method comprises the steps of specifying a communication rule set that specifies a communication regimen between the Ethernet components wherein the regimen specifies transmission of an Ethernet packet from a first of the Ethernet components to a second of the Ethernet components when at least a first state of at least one system operating parameter occurs, storing the communication rule set within the memories of each of the first and second Ethernet components, monitoring the at least one operating parameter state and when the first state of the at least one operating parameter occurs: (i) transmitting an Ethernet packet from the first Ethernet component to the second Ethernet component and (ii)

monitoring packets received by the second Ethernet component and, when the transmitted packet is not received, performing an alarm function.

Thus, rendering communication rules accessible via components that transmit or receive communications pursuant to the rules facilitates rule tracking by the components and allows each component to separately determine when a packet that should have been transmitted and received was not transmitted and received for some reason.

In some embodiments the operating parameter is time, the first state is at least one specified transmission time and the step of monitoring the at least one operating parameter includes the step of tracking the current time and comparing the current time to the specified transmission time and, wherein the step of monitoring packets includes the step of monitoring packets during an expected transmission period following the transmission time.

Hence, one particularly useful rule operating parameter or factor is time. For instance, assume a camera is linked to and controlled by a controller and a minimum possible time between collection of image data by a camera is five seconds but often, based on other system parameters, the controller determines that no image should be generated. In this case a time based rule may require the controller to send a data packet corresponding to the rule to the camera every five seconds where the packet either commands that an image should be generated or that no image should be generated. Thereafter, the time based rule is stored where both the controller and the camera can access the rule and each component tracks communications to ensure timely communications that are consistent with the rule.

The step of storing may include storing the communication rule set in the controller memory, transmitting a hand shake data packet including the rule set to the device, identifying the rule set within the handshake packet and storing the rule set within the device memory.

The step of specifying may further include the step of specifying at least one confirmation rule that specifies transmission of a return data packet back to the controller when the device receives a packet from the controller within the expected transmission period and, wherein, the method further includes the step of, when the device receives a packet from the controller within an expected transmission period, transmitting the return data packet to the controller.

In some embodiments the expected transmission period is a first expected period and the rule set further specifies a second expected transmission period in which a return data packet is expected from the device and, wherein the method further includes the steps of monitoring packets received by the controller and, when a return data packet is not received from the device within the second expected transmission period, performing an alarm function. In some cases the rules specify a plurality of transmission times.

Thus, while conventional Ethernet processes (i.e., counting of retransmission attempts after collisions up to a maximum number) may be relied upon for a transmitting component to determine if a transmitted packet was received by a destination device, a more robust system can be provided wherein a receiving device can transmit a confirmation packet back to a transmitting device to confirm that a packet has been received.

The step of performing an alarm function may include activating at least one of an audible and visual alarm indicator. In some cases the step of performing an alarm function includes transmitting an alarm packet from the second Ethernet component to the first Ethernet component.

Thus, consistent with the object of providing a more robust Ethernet system, any packet that is to be received by a device but is not may cause the device to transmit an alarm packet to the transmitting device effectively confirming imperfect delivery.

Moreover, in some embodiments the invention includes a process whereby a first packet transmitted to a device is used to control a device function. For instance, a controller may periodically transmit commands to a camera to control (i.e., active or deactive) a picture taking function. In this case the method may further include the steps of, when a first packet is not received by the camera within an expected transmission period, the camera generating a picture or image and storing the image to be either used or discarded as a function of future packets received from the controller. Furthermore, where the controller determines that a previous packet was not received by a destination camera within an expected time period the controller may transmit another packet to the camera to provide disposition instructions for the previously stored picture. Where the rules specify periodic function controlling packet transmission to the camera, the disposition instructions may be a part of the next periodic packet transmission.

In some embodiments the packet includes instructions for the device to either perform a function or not to perform a function.

The invention also includes a communication system for use with an Ethernet channel, the system for rendering communication between Ethernet components deterministic and comprising a controller linked to the channel and including a controller processor, a device linked to the channel and including a device processor, the controller and the device each being an Ethernet component a controller memory linked to the controller processor, the memory storing a communication rule set that specifies a communication regimen between the Ethernet components wherein the regimen specifies transmission of an Ethernet packet from a first of the Ethernet components to a second of the Ethernet components when at least a first state of at least one system operating parameter occurs, a device memory linked to the device processor and also storing the communication rule set, wherein the processors each monitor the at least one operating parameter state and when the first state of the at least one operating parameter occurs: (i) the first Ethernet component processor transmits an Ethernet packet to the second Ethernet component and (ii) the second Ethernet component processor monitors packets received by the second Ethernet component and, when the transmitted packet is not received, performs an alarm function.

Here the operating parameter may be time, the first state is at least one specified transmission time and the processors monitor the at least one operating parameter by tracking the current time and comparing the current time to the specified transmission time and wherein the second Ethernet component processor monitors packets by monitoring packets during an expected transmission period following the specified transmission time.

In some embodiments the rule set further specifies at least one confirmation rule that specifies transmission of a return data packet back to the controller when the device receives a packet from the controller within the expected transmission period and, wherein, the device processor transmits a return data packet to the controller when the device receives a packet from the controller within an expected transmission period.

In addition, consistent with the methods described above and in more detail below, in some embodiments the expected transmission period is a first expected transmission period, the device processor is programmed to transmit a return data packet back to the controller within a predefined period of receiving a packet from the controller and the rule set includes a confirmation rule that specifies a second expected transmission period in which a return packet is expected from the device after a packet is sent to the device and wherein, the controller processor further monitors packets received by the controller and, when a return data packet is not received from the device within the second expected transmission period, performs an alarm function.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DESCRIPTION OF THE PREFERRED EMBODIMENT

As an initial matter is should be appreciated that the exemplary control process and Ethernet linked system described herein has been simplified in an effort to focus on the inventive methods and apparatus claimed. To this end the exemplary system only includes a small number of components and the processes described are not very detailed. Nevertheless, it should be understood that, while advantageous even in a simple system, the value of the present invention increases as system complexity is increased.

Referring now to the drawings wherein like reference characters represent similar elements throughout the several views and, more specifically, referring to FIG. 1, the present invention will be described in the context of an exemplary control system 10 including a plurality of controllers 12, 14, 16 linked to a plurality of devices 18, 20, 22 and 24 via a conventional Ethernet network 69 of cables, fiber-optics, etc. Each of controllers 12, 14 and 16 is linked to each other and is also linked to each of the devices 18, 20, 22 and 24, via Ethernet 69. Each of controller 12, 14 and 16 may take any of several different forms (e.g., a PC, a workstation, a server, etc.) but, generally, perform similar functions. In order to simplify this explanation, only a first controller 12 will be described here in some detail. Hereinafter, generally, the controllers 12, 14, etc. and devices 18, 20, etc., will be referred to collectively as Ethernet components.

Figure 1:
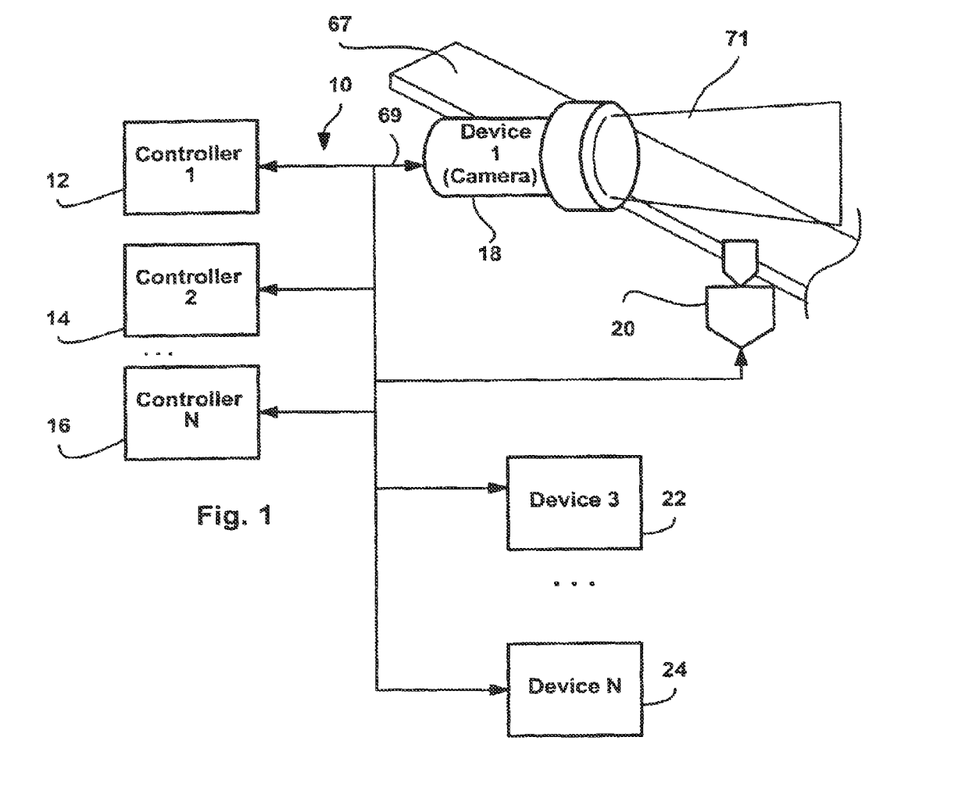
FIG. 1 is a schematic view of an exemplary Ethernet system.
Figure 2:
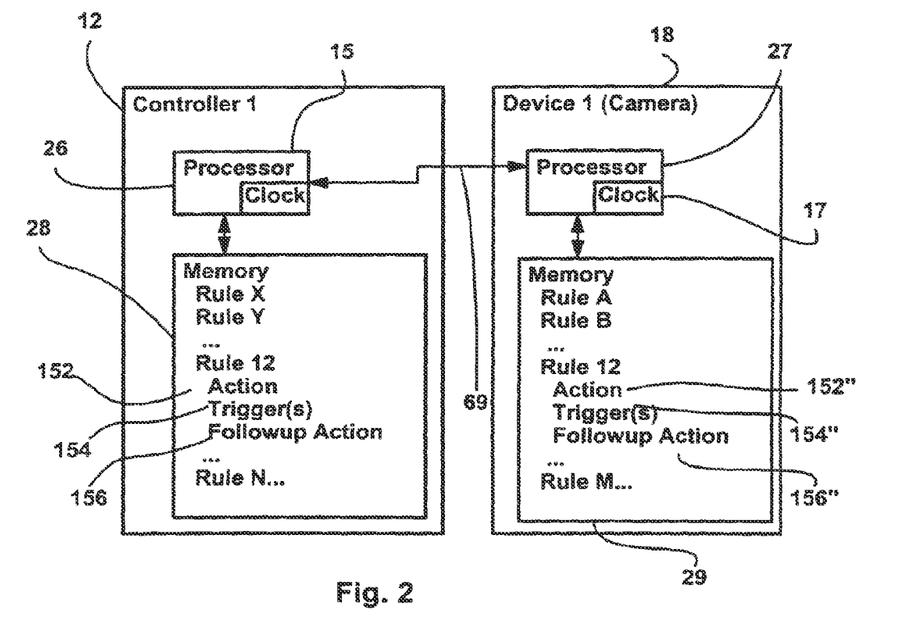
FIG. 2 is a schematic diagram of one of the controllers and one of the devices illustrated in FIG. 1.

Referring to FIGS. 1 and 2, controller 12, as indicated above, may take any of several different forms, but, at the very least, includes a processor 26 and a memory 28 that is accessible to processor 26. Processor 26 includes a clock 15. Processor 26 is directly linked to Ethernet 69 for two-way communication thereacross.

Referring still to FIGS. 1 and 2, each of devices 18, 20, 22 and 24 is similar and therefore in the interest of simplifying this explanation, only devices 18 and 20 will be described here in some detail. Device 18 is a camera which, like controller 12, includes its own device processor 27 and its own device memory 29 accessible to device processor 27. Processor 27 includes a clock 17. Also, like controller 12, device processor 27 is directly linked to Ethernet 69 for two-way communication thereacross. Camera 18 has a field of view 71 which includes a space at an adjacent workstation along a manufacturing transfer line 67.

In the present example device 20 is a proximity switch that is juxtaposed next to the workstation associated with camera 18 such that switch 20 is activated when a workpiece is positioned at the station and is deactivated when there is no workpiece at the station. Because processor 26 is linkable to each of network devices 18, 20, 22, etc., processor 26 may tie activation or control of one device to the condition or a set of conditions of any of other network devices. In the present example it will be assumed that one criteria that must be met for processor 26 to activate camera 18 to generate a picture or image is that proximity switch 20 must be activated (i.e., a workpiece) must be located at the adjacent station.

Any of controllers 12, 14 or 16 or devices 18, 20, 22 or 24 is capable of communicating with any other devices or controllers that are linked to Ethernet 69. To this end, referring now to FIG. 3, an exemplary Ethernet data packet 30 that may be generated by any of the Ethernet components in FIG. 1 is illustrated. Data packet 30 includes a plurality of fields including a sending address field 64, a destination address field 66, a general data field 68 and an error checking field 70 for determining whether or not data packets have been delivered in their original form. Data provided in error checking field 70 and how that data is used within an Ethernet enabled component is well known in the art and therefore will not be explained here in detail.

Figure 3:
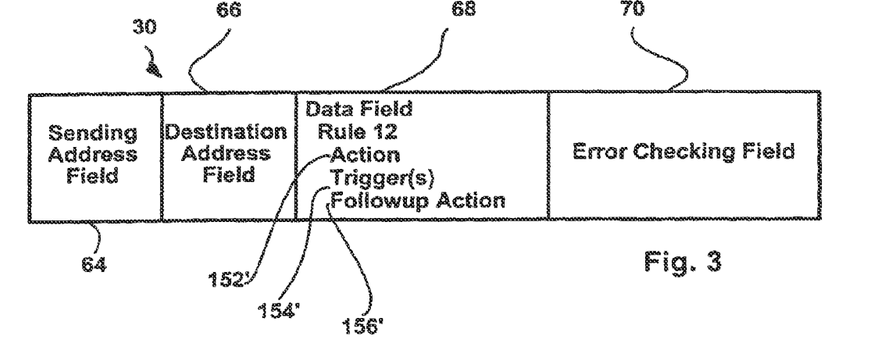
FIG. 3 is a schematic diagram illustrating an exemplary Ethernet data packet including various fields.

Each of address fields 64 and 66 is, typically, a 48 bit field in which an Ethernet component unique address is provided that uniquely identifies a particular component linked to the Ethernet 69. For example, controller 12 has a unique 48 bit address, device 18 has its own unique 48 bit address and so on. In order to communicate, an Ethernet component constructs a packet 30 identifying the packet constructing component by its 48 bit address in the sending address field 64, identifying a destination component by its 48 bit address in field 66 and providing general data to be transmitted within the packet via general data field 68. For instance, for controller 12 to cause camera 18 to take a picture, controller 12 provides its address in field 64, provides the address of camera 18 in field 66 and provides data corresponding to a "take picture" command in field 68.

When the exemplary data packet 30 is transmitted by controller 12 onto Ethernet 69, the packet 30 is transmitted to all components linked to Ethernet 69. Each component receiving packet 30 dissects the packet and identifies the destination address in field 66. If the destination address corresponds to the 48 bit address identifying a particular component, the component accesses the data in field 68 and uses the data accordingly. In the example above, camera 18 recognizes the destination address as corresponding to its address and accesses the data in field 68. Again, the data in field 68 in the present example indicates whether or not camera 18 should take a picture and camera 18 responds accordingly.

In order to render the system described above deterministic with respect to communications between Ethernet components, a commissioning process is performed whereby communication rule sets are established that correspond to certain types of communications between specific Ethernet components. Components that either transmit or receive data packets corresponding to a specific rule will be referred to hereinafter as "participant components". After the commissioning procedure, the rule sets are stored within the participant components such that each participant component can track communications and insure that corresponding rules occur.

For instance, referring again to FIGS. 1 and 2, controller 12 may be programmed to control camera 18 and cause camera 18 to take a picture every time controller 12 identifies a specific set of system operating characteristics. In the present example, it will be assumed that the shortest period between consecutive pictures taken by camera 18 may be 5 seconds and that much longer periods (e.g., 20 seconds) between consecutive pictures may occur with controller 12 determining when pictures should be taken and then causing camera 18 to take the pictures at the appropriate times. In this case, a communication rule set corresponding to participant components controller 12 and camera 18 may require that some Ethernet data packet be transmitted from controller 12 to camera 18 every five seconds where some of the data packets indicate that a picture should be taken and other data packets indicate that a picture should not be taken at the specific times. The exemplary rule set is then stored within each of controller 12 and camera 18 memories and can be used, as described in more detail below, to insure deterministic communication between controller 12 and camera 18, at least with respect to the specific rule. Hereinafter the controller-camera process will be referred to generally as "the exemplary control process".

In the example above the participating components include controller 12 and camera 18 and the rule set specifies that every 5 seconds controller 12 will transmit a data packet to camera 18 that either causes camera 18 to take a picture or to forego taking a picture as a function of other system operating characteristics. More specifically, it will be assumed that the other operating characteristics include two factors. A first factor is temporal and a second factor is mechanical. With respect to the first factor, according to the exemplary rule, controller 12 is to send a packet to camera 18 every five seconds. With respect to the second factor, the packets sent to camera 18 should cause camera 18 to take a picture every time proximity switch 20 senses work piece presence at the beginning of a five second period and should forego taking a picture when switch 20 does not sense a work piece.

Figure 4:
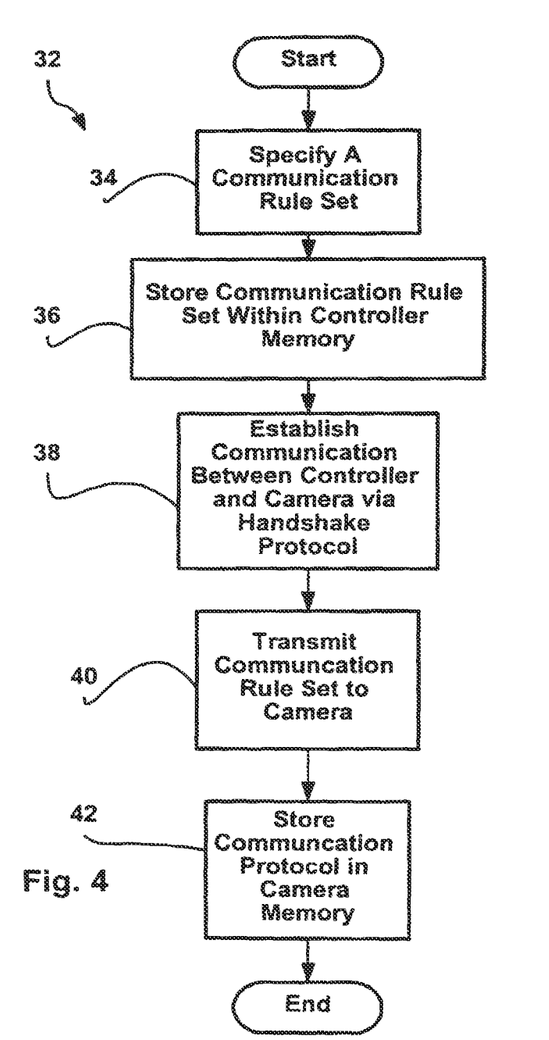
FIG. 4 is a flow chart illustrating a commissioning method according to the present invention.

Referring now to FIG. 4, an exemplary commissioning procedure 32 according to the present invention is illustrated. Referring also to FIGS. 1 through 3, at block 34, a communication rule set is specified. This step of specifying a communication rule set may be performed by a system operator using an interface (not illustrated) linked to controller processor 26 or may be performed by downloading a communication rule set to processor 26 which is then stored within memory 28. In any event, the communication rule set specifies at least two participating system components and specifies a rule set corresponding to communication between the two components.

Referring also to FIG. 3, a rule 12 corresponding to the exemplary control process is one of several rules (e.g., Rule X, Rule Y, etc.) stored within memory 28. The rule number (i.e., 12) is provided to distinguish rules as, in some cases, there may be two or more rules that correspond to the same two participating components (e.g., the exemplary control process rule described above and perhaps a second separate safety rule that both apply to components 12 and 18).

Rule 12, in addition to including a rule specific identifier (e.g., 12), also includes three additional data segments generally useful in performing deterministic communication. A first segment is an "Action" segment 152 and, as the label implies, indicates some action that is to be performed according to Rule 12. In the exemplary control process the action to be performed is transmission of a data packet from controller 12 to camera 18. More specifically, the action to be performed may be to either transmit a message to take a picture or to forego taking a picture, depending on the activation status of position sensor 20 (i.e., when sensor 20 is activated a picture should be taken and when sensor 20 is not activated the picture should be foregone). Thus, Action segment 152 specifies two separate packet transmissions (e.g., take and forego taking pictures) and also specifies camera 18 as the destination device and controller 12 as the transmitting device.

A second segment is a "Trigger(s)" segment 154 and, as the label implies, specifies one or more occurrences that should trigger the actions specified in segment 152. For instance, in the exemplary control process there is one trigger that has to occur for controller 12 to transmit a packet to camera 18 and there is a second trigger that determines which packet transmission (i.e., take or forego taking a picture) should be transmitted to camera 18. Consistent with the above example, the first trigger includes the passing of a five second period (i.e., a specified transmission time) and the second trigger includes activation of proximity switch 20 indicating presence of a workpiece.

A third data segment is a "Follow-up Action" segment 156 which, as the label implies, specifies some additional action to be performed by a network component during or after completion of an action specified in segment 152. For instance, in the case of controller processor 26, a follow-up action upon transmitting a packet to camera 18 may be to monitor return packets for a confirmation packet confirming receipt by camera 18. As another example, an event action for camera 18 may be to construct and transmit a confirmation packet back to controller 12 upon successful reception of a packet pursuant to Rule 12.

In at least one embodiment the follow-up action segment 156 may be omitted and such actions may be programmed in some manner other than by using a packet 30. For instance, dedicated software may be provided in camera memory 29 that instructs camera processor 27 to perform various functions upon successful reception of a packet pursuant to Rule 12. As another instance, an event action may comprise a portion of another rule that corresponds to two or more participant components.

Referring still to FIGS. 1-4, at block 36, processor 26 stores the communication rule set within memory 28. At block 38, processor 26 establishes communication between controller 12 and camera 18 via a handshaking protocol. To this end, handshaking protocols are well known in the art and therefore will not be described here in detail. It should suffice, in this regard, to say that the handshaking protocol simply allows a controller to identify a specific device linked to Ethernet 69 and, typically would cause the identified device to send a data packet back to the controller that initiated the handshaking protocol to indicate that the device received the initial data packet and to confirm communication.

Referring still to FIGS. 1 through 4, at block 40, after the handshaking protocol has been completed, processor 26 transmits the communication rule set to camera 18 via a data packet like that illustrated in FIG. 3. Referring specifically to FIG. 3, consistent with the example above, exemplary packet 30 fully specifies a complete rule set or communication regimen where sending and destination participating component addresses are provided in fields 64 and 66 and data field 68 includes information that specifies all rule information necessary for a destination component to track operation of the specific rule. For instance, consistent with Rule 12 described above, field 68 specifies Rule 12 including action 152', trigger(s) 154' and follow-up action 156' that correspond to action 152, trigger(s) 154 follow-up action 156 limitations in memory 28, respectively.

At block 42, camera processor 27 receives the transmitted packet, identifies camera 18 as the intended recipient participating component and stores at least a sub-set of the data received within the packet as a rule in camera memory 29 for subsequent use. To this end, referring specifically to memory 29 in FIG. 2 and packet 30 in FIG. 3, regarding the exemplary control process, processor 27 stores Rule 12 including action 152", trigger(s) 154" and follow-up action 156 segments.

Note that system parameters are automatically determined by controller 12 and/or camera 18 as a function of the specific Ethernet configuration and are used to program each of the network component processors. For instance, one system parameter is the expected duration of a transmission period (herein a "first expected transmission period") which is the longest possible time it may take for a data packet to be received by a participating component after transmission. For example, where the number of transmission attempts on an Ethernet network prior to discarding a packet is 16 and a successful transmission requires 3 micro seconds, the transmission period would be 48 micro seconds (i.e., 3×16 micro seconds).

Similarly, a second expected transmission period may be set to a duration twice as long as the transmission period and may correspond to the worst case period required for a transmission to be transmitted from a first network component to a second and for the second component to transmit a confirming message back to the first component. Here, for instance, a transmission from the first to the second components may, assuming successful transmission upon a $16^{th}$ attempt, take 48 μsec. and a return confirmation transmission may require another 48 μsec. (i.e., assuming success on the $16^{th}$ attempt) for a total of 96 μsec. as the second expected transmission period. These transmission periods are used in the monitoring processes described below and may affect the rules used by Ethernet components to track communications. For instance, when tracking a time based transmission that is triggered at a specified transmission time, the transmission will not arrive at the receiving component at the specified transmission time but rather within the first expected transmission period and therefore monitoring for reception must be during the entire period, not simply at the transmission time.

It should also be noted that, while two or more network components may be participant components (i.e., transmitting or receiving components) affect by a specific communication rule (e.g., Rule 12), the sub-set of rule information that must be stored within the memories of the participant components may be different. For instance, in the case of Rule 12, where controller 12 stores Rule 12 information, controller 12 may be programmed to recognize itself as the transmitting component and, in that case, needn't to store the transmitting device information (i.e., the controller 12 address). Similarly, where camera 18 stores Rule 12 information, camera 18 may be programmed to recognize itself as the receiving component and, in that case, needn't store the receiving device information (i.e., the camera 18 address). As another example, in this regard, for the purposes of satisfying Rule 12 criteria, camera 18 need only confirm that a transmission pursuant to Rule 12 be received within an expected transmission period following a specified transmission time and therefore needn't store information regarding other triggers (i.e., activation state of the proximity sensor 20) corresponding to Rule 12. Despite the fact that components corresponding to a rule may store only a subset of rule information, in order to simplify this explanation, the present example is described in the context of a system wherein all Rule 12 information is stored in each participant component (i.e., camera 18 and controller 12) that either receives or transmits pursuant to Rule 12.

Figure 5:
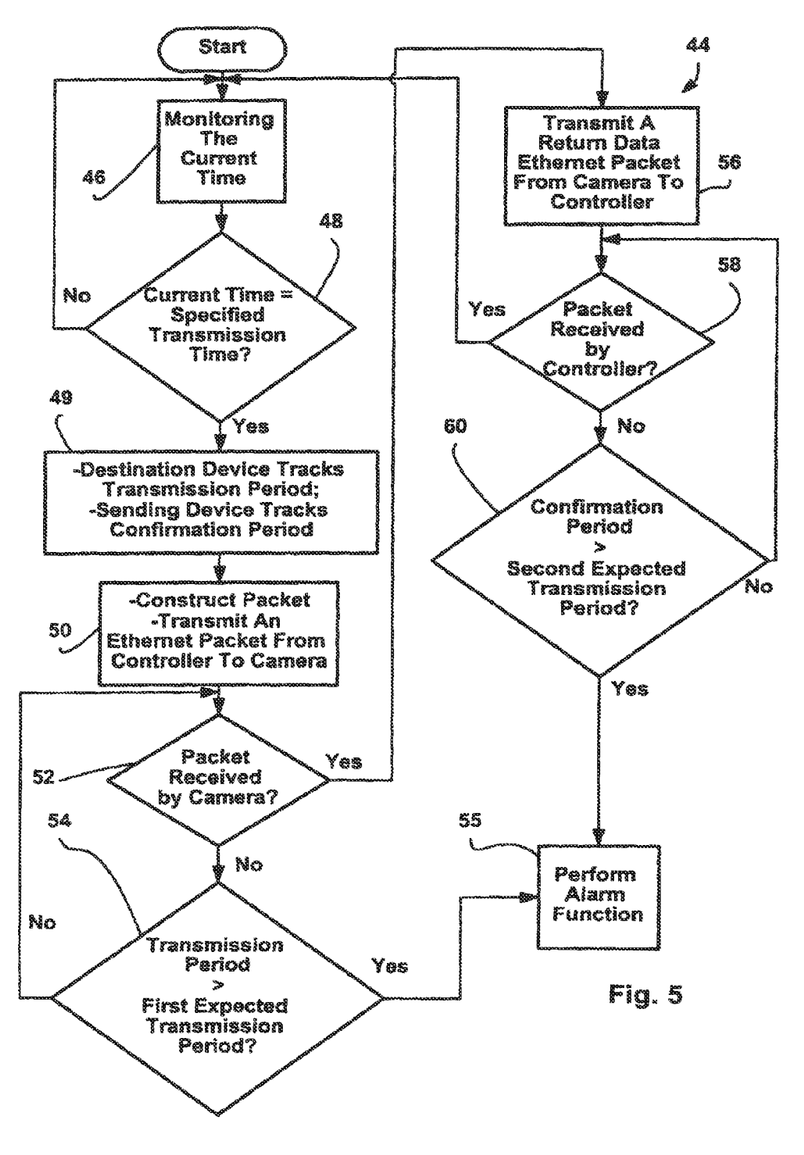
FIG. 5 is a flow chart illustrating a deterministic communication method according to the present invention.

Referring now to FIG. 5, an exemplary deterministic communication method 44 according to the present invention is illustrated. Referring also to FIGS. 1 through 3, beginning at block 46, processor 26 monitors a current time via clock 15. At block 48, processor 26 compares the current time to the specified transmission time in trigger(s) segment 154. Where the current time is not yet equal to the specified transmission time, control loops back through blocks 46 and 48 continually. Where the current time is the specified transmission time, control passes to block 49 where, when the transmission time occurs, processor 27 begins to track the transmission period corresponding to the time it takes for a packet transmitted by controller processor 26 to be received by camera processor 27.

In addition, at block 49 processor 26 begins to track a confirmation period corresponding to the time it takes for the packet transmitted by processor 26 to be received by the destination component (i.e., camera 18) and for a confirmation packet to be transmitted back from camera 18 to processor 26.

Figure 6:
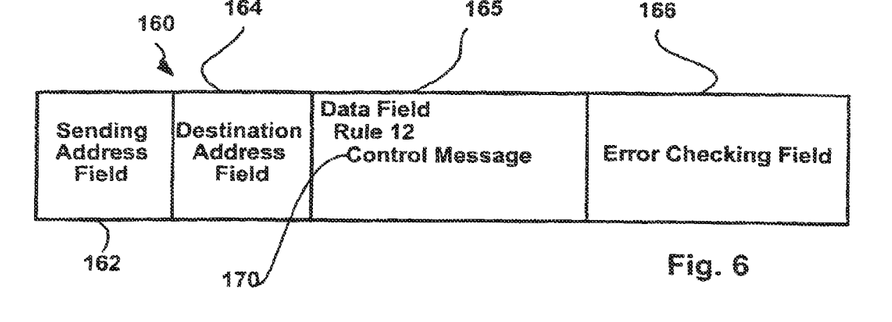
FIG. 6 is similar to FIG. 3, albeit of a different data packet.

Next, at block 50 controller processor 26 examines other trigger parameters to collect information needed to construct a data packet to be transmitted to camera 18. In the present example, processor 26 determines the state of proximity switch 20 (see FIG. 2) and, consistent with the rules described above, generates a command message that will either cause camera 18 to take or forego taking a picture as a function of switch 20 activation. Referring also to FIG. 6, an exemplary command data packet 160 is illustrated including fields 162, 164 and 166 that correspond to fields 64, 66 and 70, respectively, in FIG. 3. Fields 162, 164 and 166 serve the same functions as similar fields in FIG. 3 and therefore are not described again here. Data field 165 identifies Rule 12 and includes a control message 170. Also, at block 50, processor 26 transmits packet 160 from controller 12 to camera 18.

At block 52, where camera processor 27 receives an Ethernet packet from controller 12, control passes to block 56. Referring still to block 52, where camera 18 does not receive a packet from controller 12, control passes to block 54. At block 54, processor 27 compares the transmission period (i.e., the period duration since the specified transmission time) to the first expected transmission period (i.e., the maximum amount of time necessary to successfully transmit a packet on the system). Where the transmission period is less than the first expected transmission period, control passes again back up to block 52 where processor 27 again determines whether or not camera 18 has received a packet from controller 12. This cycling process through blocks 52 and 54 continues until either camera 18 receives a packet from controller 12 and passes control to block 56 or, until the transmission period duration is greater than the first expected transmission period. At block 54, where the transmission period exceeds the first expected transmission period, control passes to block 55 where camera processor 27 causes an alarm function to be performed.

Referring still to FIGS. 1 through 3 and FIG. 5, after camera 18 receives a packet from controller 12 in the illustrated embodiment, at block 56, camera 18 constructs a return data Ethernet packet specifying camera 18 as a sending device, controller 12 as the destination device and providing information in the data field indicating that the packet from controller 12 has been received. Thereafter, at block 56, camera 18 transmits the return data Ethernet data packet on Ethernet 69 to controller 12.

At block 58, controller processor 26 monitors to determine whether or not the return data packet has been received from camera 18. Where the return data Ethernet packet has been received, control again passes back up to blocks 46 and 48 where controller 12 starts the process over again by monitoring the current time and comparing the current time to the next specified transmission time in the communication rule set.

Referring still to block 58, where no return data data packet is received by controller processor 26, control passes to block 60 where controller processor 26 compares the confirmation period (i.e., the period duration since the transmission time) to the second expected transmission period (i.e., two times the maximum amount of time necessary to successfully transmit a packet on the system). Where the confirmation period is less than the second expected transmission period, control again passes back up to block 58 where controller processor 26 again determines whether or not a return data packet has been received. This cycling process through blocks 58 and 60 continues until either a return data data packet has been received by controller 12 or the confirmation period exceeds the duration of the second expected transmission period. When the confirmation period exceeds the duration of the second expected transmission period, control passes from block 60 to block 55 where, once again, an alarm function is performed.

The alarm function performed at block 55 may take any of several different forms including, but not limited to, activating an audible alarm or a visual alarm or activating both an audible and a visual alarm. In cases where the device processor 27 recognizes that one of the communication rules has been broken, processor 27 may facilitate an alarm function by transmitting an alarm data packet to controller 12 or to some other interface indicating to a system user that a problem has occurred.

Figure 7:
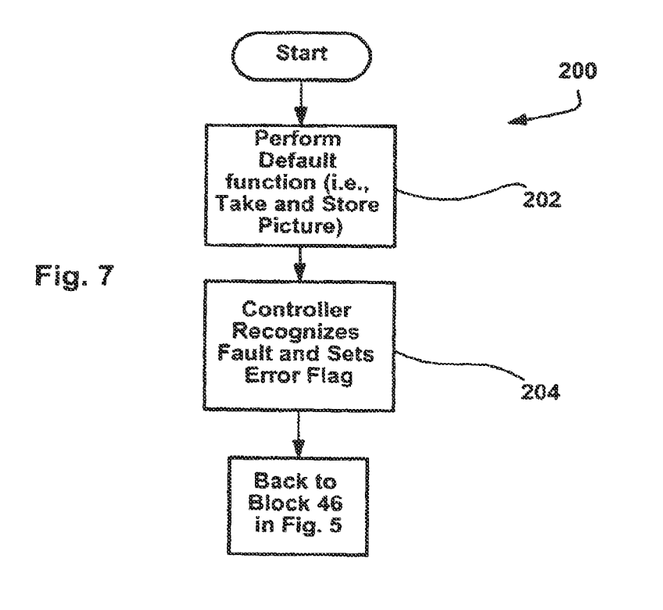
FIG. 7 is an exemplary alarm function method segment.

Moreover, the alarm function may be more complicated. For instance, referring to FIG. 7, an exemplary alarm method 200 is illustrated. Method 200 may be specified as part of an initially stored Rule 12 or, as indicated above, may be separately programmed in any of several different well known manners. Referring also to FIGS. 1-3, at block 202, when camera 18 fails to receive a first data packet from controller 12 at a specified transmission time, camera 18 is programmed to perform a default process including generating and storing a picture. At block 204, controller 12 recognizes that a transmitted packet has not been received by camera 18 within the expected transmission period and sets an error flag.

Next referring again to FIG. 5, control passes back to block 46. At block 46 the process described above is repeated and, when the trigger(s) occur to cause controller 12 to construct a packet at block 50 for delivery to camera 18, the set error flag causes controller 12 to construct a packet that includes two components in the data field (e.g., see 165 in FIG. 6). First, the data field includes a segment to control camera 18 at the specific instant in time (i.e., an instant corresponding to the most recent specified transmission time). For instance, this first segment may instruct camera 18 to take a picture. Second, the data field includes a segment indicating how camera 18 should dispose of the stored picture corresponding to the previous specified transmission time.

Thereafter, at block 52, controller 12 transmits the packet to camera 18. At block 58, when camera 18 receives the packet, camera 18 parses the data field into the two segments corresponding to the current and previous specified transmission times, uses the first segment to control the camera 18 and uses the second segment to dispose of (i.e., further process or discard) the stored picture.

It should be understood that the methods and apparatuses described above are only exemplary and do not limit the scope of the invention, and that various modifications could be made by those skilled in the art that would fall under the scope of the invention. For example, while described in the context of a controller and a camera, it should be appreciated that the invention may be employed in the case of other Ethernet linked devices to facilitate deterministic system control. In addition, while time is a relatively useful triggering factor, other non-temporal factors may be employed. For instance, camera activation may be required upon the activation of two separate proximity sensors where a first of the sensors may be linked to camera 18 via Ethernet 69 while the second of the sensors is linked to controller 12 via a non-Ethernet connection. In this case a rule for camera 18 may be that a packet must be received from controller within a first expected transmission period from the first sensor via the Ethernet. In this case camera 18 tracks a transmission period starting at reception of a packet from the first sensor and controls alarming accordingly. Moreover, the handshaking process may include transmission of a rule set a part of a handshaking data packet so that a single process establishes both communication and rule transfer.

Furthermore, while the embodiment described above teaches a rule including a confirmation rule or requirement, it should be appreciated that the confirmation rule aspect (see blocks 56, 58 in FIG. 5) is not necessary to practice all embodiments of the invention and that, indeed, in many cases, an Ethernet based processor will be capable of independently determining if a transmitted data packet has or has not been successfully received by a destination device.

We claim:

1. A method for use with a system including an Ethernet controller linked via an Ethernet channel to an Ethernet device, the device to be controlled by the controller, wherein each of the controller and the device are Ethernet components, the controller including a controller processor and a controller memory and the device including a device processor and a device memory, the method for rendering communication between the device and the controller deterministic and comprising the steps of:

specifying a communication rule set that specifies a communication regimen between the Ethernet components wherein the regimen specifies transmission of a first Ethernet data packet from a first of the Ethernet components to a second of the Ethernet components when at least a first state of at least one system operating parameter occurs;

storing the communication rule set within the memories of each of the first and second Ethernet components;

monitoring the at least one operating parameter state; and when the first state of the at least one operating parameter occurs, monitoring packets received by the second Ethernet component and, when the first packet is not received, performing a first alarm function;

wherein the operating parameter is time, the first state is at least one pre-specified transmission time and the step of monitoring the at least one operating parameter includes the step of tracking the current time and comparing the current time to the pre-specified transmission time.

2. The method of claim 1 wherein the first Ethernet component is the controller and the second Ethernet component is the device.

3. The method of claim 2 wherein the step of storing includes storing the communication rule set in the controller memory, transmitting the first data packet including the rule set to the device, identifying the rule set within the first packet and storing the rule set within the device memory.

4. The method of claim 2 wherein the step of specifying further includes the step of specifying at least one confirmation rule that specifies transmission of a return data packet back to the controller when the device receives the first packet from the controller within the expected transmission period and, wherein, the method further includes the step of, when the device receives a first packet from the controller within an expected transmission period, transmitting the return data packet to the controller.

5. The method of claim 4 wherein the step of monitoring packets includes the step of monitoring packets during an expected transmission period following the pre-transmission time, and wherein the expected transmission period is a first expected period and the rule set further specifies a second expected transmission period in which the return data packet is expected from the device and, wherein the method further includes the steps of monitoring packets received by the controller and, when the return data packet is not received from the device within the second expected transmission period, performing a second alarm function.

6. The method of claim 4 wherein the first packet specifies a function to be performed by the device.

7. The method of claim 6 wherein, when the first packet is received, the method further includes the steps of the device performing the specified function and generating the return data packet indicating that the function has been completed.

8. The method of claim 6 wherein the alarm function includes performing a default function.

9. The method of claim 2 wherein the expected transmission period is a first expected transmission period, the device is programmed to transmit a return data packet back to the controller within a predefined period of receiving an initial packet from the controller and the rule set includes a confirmation rule that specifies a second expected transmission period in which a return packet is expected from the device after an initial packet is sent to the device and wherein, the method further includes the steps of monitoring packets received by the controller and, when a return data packet is not received from the device within the second expected transmission period, performing a second alarm function.

10. The method of claim 1 wherein the rules specify a plurality of transmission times.

11. The method of claim 1 wherein the step of performing the first alarm function includes activating at least one of an audible and visual alarm indicator.

12. The method of claim 1 wherein the step of performing the first alarm function includes transmitting an alarm packet from the second Ethernet component to the first Ethernet component.

13. The method of claim 1 wherein the device is a camera.

14. A method for use with a system including an Ethernet controller linked via an Ethernet channel to an Ethernet device, the device to be controlled by the controller, wherein each of the controller and the device are Ethernet components, the controller including a controller processor and a controller memory and the device including a device processor and a device memory, the method for rendering communication between the device and the controller deterministic and comprising the steps of:

specifying a communication rule set that specifies a communication regimen between the Ethernet components wherein the regimen specifies transmission of a first Ethernet data packet from a first of the Ethernet components to a second of the Ethernet components when at least a first state of at least one system operating parameter occurs;

storing the communication rule set within the memories of each of the first and second Ethernet components;

monitoring the at least one operating parameter state; and when the first state of the at least one operating parameter occurs and irrespective of whether or not any data packets have been at least one of transmitted from the first Ethernet component to the second Ethernet component and received at the second Ethernet component, monitoring packets received by the second Ethernet component and, when the first packet is not received, performing a first alarm function;

wherein the device is a camera and the alarm function is to take a picture and wherein, when the device fails to receive the first packet within an expected transmission time, the method further includes the steps of the camera taking a picture, storing the picture data in the device memory and waiting for further instructions from the controller regarding disposition of the stored picture.

15. The method of claim 14 further including the steps of the controller determining when the device fails to receive the first packet within the expected transmission time and, when the device fails to receive a first packet within the expected transmission time, the controller transmitting another data packet instructing the device regarding disposition of the stored picture.

16. The method of claim 15 wherein the rule set specifies periodic specified transmission times and wherein, when the device fails to receive the first packet within an initial expected transmission time, at the next transmission time, the controller generates a next data packet including instructions regarding the function at the next transmission time and the also regarding the function at the initial transmission time and transmits the next data packet to the device at the next transmission time.

17. A communication system for use with an Ethernet channel, the system for rendering communication between Ethernet components deterministic and comprising:

a controller linked to the channel and including a controller processor;

a device linked to the channel and including a device processor, the controller and the device each being an Ethernet component;

a controller memory linked to the controller processor, the memory storing a communication rule set that specifies a communication regimen between the Ethernet components wherein the regimen specifies transmission of an Ethernet packet from a first of the Ethernet components to a second of the Ethernet components when at least a first state of at least one system operating parameter occurs;

a device memory linked to the device processor and also storing the communication rule set;

wherein the processors each monitor the at least one operating parameter state and when the first state of the at least one operating parameter occurs, the second Ethernet component processor monitors packets received by the second Ethernet component and, when the first transmitted packet is not received, performs a first alarm function;

wherein the operating parameter is time, the first state is at least one pre-specified transmission time and the step of monitoring the at least one operating parameter includes the step of tracking the current time and comparing the current time to the pre-specified transmission time.

18. The system of claim 17 wherein the first Ethernet component is the controller and the second Ethernet component is the device.

19. The system of claim 18 wherein the rule set further specifies at least one confirmation rule that specifies transmission of a return data packet back to the controller when the device receives the packet from the controller within the expected transmission period and, wherein, the device processor transmits a return data packet to the controller when the device receives a packet from the controller within the expected transmission period.

20. The system of claim 19 wherein the step of monitoring packets includes the step of monitoring packets during an expected transmission period following the pre-transmission time, and wherein the expected transmission period is a first expected period and the rule set further specifies a second expected transmission period in which a return data packet is expected from the device and, wherein the controller processor monitors packets received by the controller and, when the return data packet is not received from the device within the second expected transmission period, the controller performs a second alarm function.

21. The system of claim 18 wherein the expected transmission period is a first expected transmission period, the device processor is programmed to transmit a return data packet back to the controller within a predefined period of receiving the packet from the controller and the rule set includes a confirmation rule that specifies a second expected transmission period in which the return packet is expected from the device after the packet is sent to the device and wherein, the controller processor further monitors packets received by the controller and, when the return data packet is not received from the device within the second expected transmission period, performs a second alarm function.

22. The system of claim 17 wherein the rules specify a plurality of transmission times.

23. The system of claim 17 further including at least one of an audible and a visual alarm and wherein the second Ethernet component processor performs the first alarm function by activating the alarm.

24. The system of claim 17 wherein the second Ethernet component processor performs the first alarm function by transmitting an alarm packet to the first Ethernet component.

25. The system of claim 17 wherein the device is a camera.

26. The system of claim 17 wherein the second Ethernet component is a camera, the first Ethernet component is a controller and the alarm function is to take a picture and wherein, when the camera fails to receive the first packet within the expected transmission time, the camera takes a picture, stores the picture data in the device memory and waits for further instructions from the controller regarding disposition of the stored picture.

27. A method for use with a system including an Ethernet controller linked via an Ethernet channel to an Ethernet device where the device is a camera, the controller including a controller processor and a controller memory and the device including a device processor and a device memory, the method for rendering communication between the controller and the device deterministic and comprising the steps of:

specifying a communication rule set that specifies a communication regimen between the controller and the camera wherein the regimen specifies transmission of an Ethernet packet from the controller to the camera at least one specified transmission time and also specifies an expected transmission period;

storing the communication rule set within the memories of each of the controller and the device; and determining when the transmission time occurs, monitoring packets received by the camera and, when a packet is not received by the camera from the controller within the expected transmission period, performing a first alarm function.

28. The method of claim 27 wherein the expected transmission period is a first expected period and the rule set further specifies a second expected transmission period in which a return data packet is expected from the device after the controller transmits a packet to the device, the step of specifying further includes the step of specifying at least one confirmation rule that indicates the second transmission period, and, wherein, the method further includes the steps of, when the device receives the packet from the controller within the expected transmission period, transmitting the return data packet to the controller; monitoring packets received by the controller and, when the return data packet is not received from the device within the second expected transmission period, performing a second alarm function.

29. The method of claim 27 wherein the alarm function is to take a picture and wherein, when the camera fails to receive the first packet within the expected transmission time, the method further includes the steps of the camera taking a picture, storing the picture data in the device memory and waiting for further instructions from the controller regarding disposition of the stored picture.

* * * * *